June 2, 1936.   W. T. HONISS   2,042,994
SHEAR MECHANISM AND METHOD OF CAUSING SLIDING CONTACT OF THE BLADES THEREOF
Filed March 2, 1935
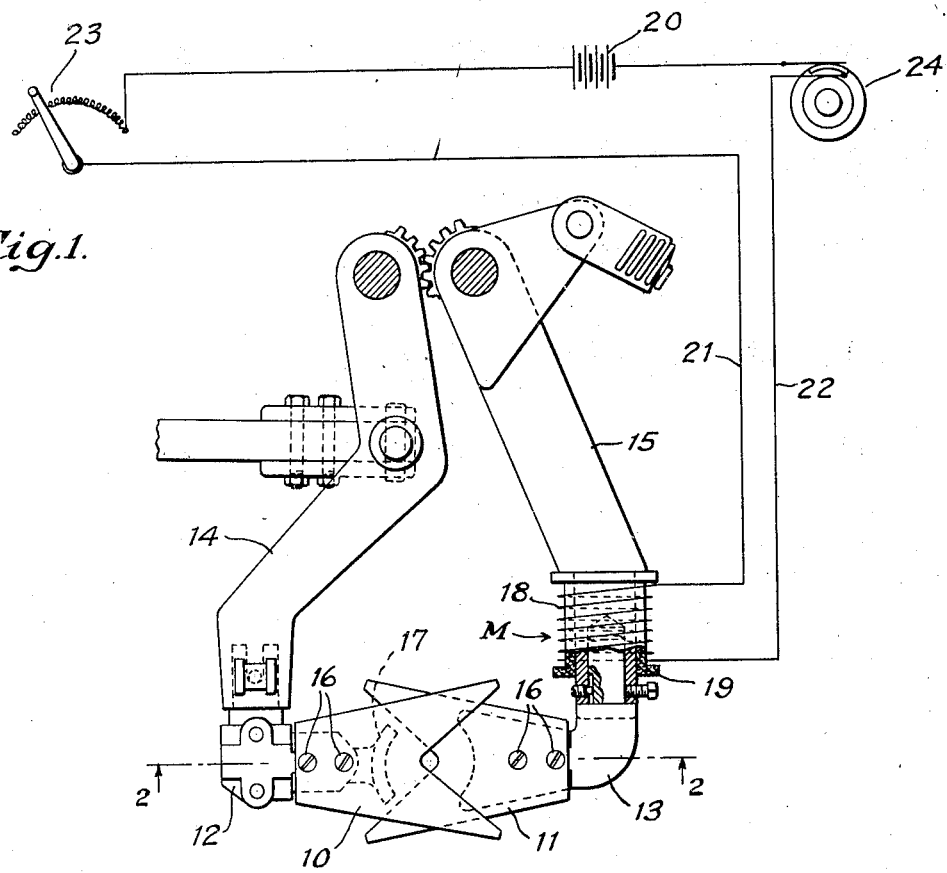
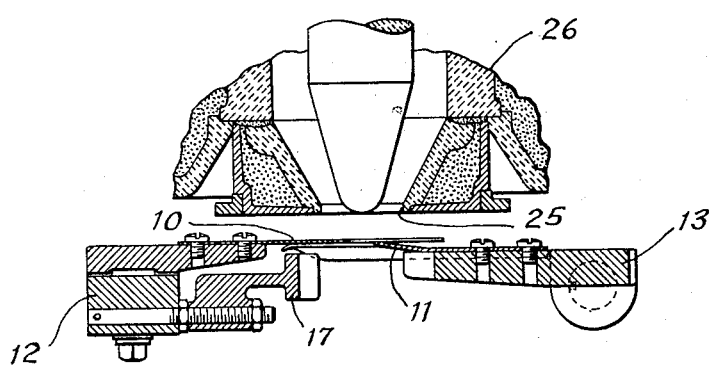
Inventor:
William T. Honiss
by Brown + Parham
Attorneys.
Witness:
A. A. Horn Patented June 2, 1936

2,042,994

UNITED STATES PATENT OFFICE 2,042,994

SHEAR MECHANISM AND METHOD OF CAUSING SLIDING CONTACT OF THE BLADES THEREOF

William T. Honiss, West Hartford, Conn., assignor to Hartford-Empire Company, Hartford, Conn., a corporation of Delaware Application March 2, 1935, Serial No. 9,059

9 Claims. (Cl. 49—14)

This invention relates generally to improvements in shear mechanisms and more particularly to shear mechanisms for severing mold charges from a column or stream of molten glass that is being fed downwardly by a glass feeder.

An object of the invention is to cause close sliding contact of the lapped cutting edge portions of cooperative shear blades in a novel and improved manner.

A further object of the invention is to cause close sliding contact between the overlapping cutting edge portions of a pair of cooperative shear blades in such a way that either or both of such shear blades may be thinner than heretofore has been practicable.

A further object of the invention is to maintain the cutting edge portions of a pair of cooperative shear blades in close sliding contact with each other during a cutting operation without imposing any appreciable bending stress on either of the blades beyond that required to produce and maintain such sliding contact.

It is desirable in severing mold charges from a pendant column or mass of molten glass, such as that produced by the operation of a modern glass feeder, to employ shear blades which will cut cleanly and quickly through the glass. By the use of a pair of thin blades or a thin upper blade of each pair, chilling and marring of the glass charges obtained would be obviated or reduced to a minimum.

However, in actual practice, cooperative blades or an upper blade of each pair have been thicker than is desired for a cutting action of highest efficiency, from the viewpoint of preventing marring and chilling of the glass charges, for the reason that blades, or an upper blade of the desired thinness would be unduly or objectionably flexed by the action of mechanical means, such as heretofore employed, for maintaining the cutting edges of such blades in close sliding contact with each other during a cutting operation.

When the present invention is carried into effect, shear blades, or the uppermost of two cooperative shear blades, may be of the desired thinness for the reason that the requisite sliding contact between the cutting edges of such blades is maintained by magnetic attraction and hence no undesirable flexure of either or both of these blades will be effected.

The present invention may be carried into effect in many ways which differ among themselves and by the use of various different specific structures. Thus, both the blades may be magnetized so as to attract each other at their cutting edges, as in the case of magnets having their unlike poles turned toward each other. When the lower of the two cooperative blades is thicker and less flexible while the upper blade is relatively thin and flexible, only the lower blade may be magnetized and the upper blade will be attracted thereto during each cutting operation.

The magnetic attraction between the blades may be made substantially permanent, as by forming the holders for the blades or the holder for one of these blades, as the lower blade, of a suitable material for retaining magnetism, as for example hardened tungsten steel, and permanently magnetizing such holder or holders in any suitable known way.

Another way to produce the desired magnetic attraction between the shear blades during such cutting operation is to form a portion of the carrying structure for each blade or for the lowermost blade as an electro-magnet, and to suitably connect this electro-magnet with a source of electric current, so that the magnet will be energized at the proper time and to the extent required to produce the desired magnetic attraction between the blades during each cutting operation. A practical embodiment of the invention making use of this last described mode of producing magnetic attraction between the shear blades is illustrated in the accompanying drawing, in which Figure 1 is a plan view, partly diagrammatic and with portions broken away and other portions shown in horizontal section, of a shear mechanism equipped with means for producing magnetic attraction between the shear blades during a cutting operation; and Fig. 2 is a fragmentary vertical section through the outlet portion of a glass feeder with shear mechanism embodying the invention disposed below the feeder outlet, the view through the shear mechanism being substantially along the line 2—2 of Fig. 1.

In Fig. 1, an upper shear blade 10 and a lower shear blade 11 are mounted on the inturned ends of the blade-carrying portions 12 and 13 of shear arms 14 and 15, respectively. These blade-carrying elements 12 and 13 might be integral portions of the shear arms but preferably are separately formed parts adjustably connected with the main portions of the shear arms in any suitable known manner. The connection between the part 12 and the remainder of the shear arm 14 is the same as that which is disclosed in Patent No. 1,760,435, granted to Karl E. Peiler for "Shear mechanism for glass feeders". The connection between the part 13 and the remainder of the shear arm 15 is different in details which are not germane to the present invention and which therefore need not be described herein. Suitable mechanism, such as that shown in part in Fig. 1, and as fully disclosed in the aforesaid Peiler patent may be provided to cause the shear arms to swing about their pivots toward each other to close the shear blades periodically and away from each other to open the shear blades after each cutting operation.

As shown, Figs. 1 and 2, the blades 10 and 11 are secured to their carriers 12 and 13 by screws 16, two of such screws being shown for each shear blade so that the connection of the rearward end portion of such blade with its carrier is fixed. The upper blade 10, as shown, is substantially flat and relatively thin, so that the outer end or cutting edge portion thereof may flex in a direction substantially at right angles with the plane of the blade to the extent required to assure close sliding contact between the cutting edge portion of the lower blade as the blades move from an open position (not shown) to closed position. This flexure need be but slight as the initial adjustments of the blades may dispose them in approximately the proper planes for sliding contact at their cutting edges when such blades are closed. Both of the blades are of the V-edged type and their cutting edges are to be maintained in contact with each other at two points as the blades are closed.

As shown, the lower blade 11 is reinforced by suitable flanges at its side edges and is suitably shaped and formed so that it will be relatively stiff, as compared with the upper blade 10, although the thickness of the cutting edge portion thereof will not be excessive.

The carrier 12 for the upper shear blade 10 may support an anti-batting or charge guide 17, which may be substantially as disclosed in the aforesaid Peiler Patent 1,760,435.

The supporting and operating structure for the lower shear blade 11, or a portion thereof, may constitute the core of an electro-magnet, generally designated M. As best seen in Fig. 1, the coil 18 of this electro-magnet surrounds an insulating sleeve 19 on the shear arm at the connection between the blade-carrier 13 and the main portion of the shear arm 15. The portion of the shear arm between the electro-magnet and the blade 11 will be formed of material of good magnetic properties. The blades likewise will be magnetic.

The coil 18 of the electro-magnet may be connected with a source of electric current supply, such as the battery 20, by suitable conductors 21 and 22. A rheostat 23 and a regulably timed circuit maker and breaker 24 may be interposed in the circuit between the battery and the magnet coil.

The operation of the specific embodiment of the invention above described will be readily understood. The circuit maker and breaker will be timed with relation to the closing of the shear blades, so that the magnetic attraction between the cutting edge portions of these blades will be relatively great or present in the desired amount each time the shear blades are moved toward their closed position. The upper and relatively thin blade 10 will flex at its outer or cutting edge portion sufficiently to assure the desired close sliding contact between its cutting edge and the cutting edge of the lower blade 11 as the blades are closed. As the blades are opened, the circuit maker and breaker 24 may break the magnetizing circuit. The lower blade then will not be magnetized when it is open except for such residual magnetism as may remain therein and in its carrier.

Shear mechanism equipped with a practical embodiment of the invention such as above described is well adapted for severing mold charges from pendant mold charge masses of glass beneath the discharge outlet of a glass feeder. Such shear mechanism is shown in Fig. 2 beneath the outlet 25 of a glass feeder 26.

Many structural expedients may be resorted to for carrying the present invention into effect under various service conditions and according to individual preferences. As hereinbefore has been pointed out, both blades may be magnetized. Also, the intensity of the magnetic attraction between the blades may be increased in any suitable known way, as by the use of material of high magnetic permeability, such as soft wrought iron, at proper places to secure such result. Also, provision may be made for the desired relative movement between the cutting edge portions of the shear blades by mounting one or both of them so that it, or they, may have limited bodily movement in response to the magnetic attraction between such blades.

These are only a few of many possible structural changes which may be made without departing from the spirit and scope of the invention. I believe that the present invention is the first in the art to propose the use of magnetic force to cause close sliding contact of the cutting edge portions of a pair of cooperative overlapping shear blades. Such invention in its broader aspect, therefore, is not limited to any particular arrangement or combination of structural elements for effecting this result. While the invention is adapted and intended primarily for use in connection with glass cutting shears and their operation, it obviously is not limited thereto.

I claim:

1. The combination with a pair of overlapping shear blades mounted for opening and closing movements and made of magnetic material, of means for causing magnetic attraction between the cutting edge portions of such shear blades during the closing movements thereof.

2. Shear mechanism comprising a pair of cooperative overlapping shear blades mounted for opening and closing movements, said shear blades being formed of magnetic material, one of said shear blades being magnetized to attract the cutting edge portion of the other blade during closing of said shear blades.

3. Shear mechanism comprising a pair of pivoted arms, blades made of magnetic material and carried by said arms in position to overlap for a cutting operation when the arms are swung toward each other, and means carried by one of said arms for magnetizing the shear blade on that arm during the closing of said shear blades.

4. Shear mechanism comprising a pair of pivoted arms, cooperative shear blades made of magnetic material and carried by said arms in position to overlap when the arms are swung to effect closing of the shear blades for a cutting operation, a portion of one of said arms constituting the core of an electro-magnet for magnetizing said shear blades, and means for energizing said electro-magnet during the closing movement of said shear blades.

5. The combination with a pair of shear blades made of magnetic material and comprising a relatively thin blade and a thicker blade, means for mounting said blades for movements toward and away from each other to effect a cutting operation and so that said blades will overlap with the thinner blade uppermost when the blades are closed, and means for magnetizing said thicker of the blades at the time said blades are closed.

6. The combination with shear mechanism for severing mold charges from glass below a feed outlet of a glass feeder, said shear mechanism comprising a pair of pivoted shear arms, cooperative blades made of magnetic material and carried by said shear arms for cutting through the glass beneath said feeler outlet, said blades being adapted to overlap when they are closed, the upper of said blades being relatively thin, and means for magnetizing the lower of said blades at the time said blades are closed.

7. The combination with shear mechanism for severing mold charges from glass below a feed outlet of a glass feeder, said shear mechanism comprising a pair of pivoted shear arms, cooperative blades made of magnetic material and carried by said shear arms for cutting through the glass beneath said feeder outlet, said blades being adapted to overlap when they are closed, the upper of said blades being relatively thin, and means for magnetizing the lower of said blades at the time said blades are closed, said means for magnetizing said lower blade comprising an electro-magnet, including a portion of the shear arm by which the lower blade is carried, and electrical connections between said electro-magnet and a source of electric current supply for supplying the desired electric current to said electro-magnet periodically in suitably timed relation with the closing of the shear blades and for breaking the connection between the electro-magnet and the source of electric current in the intervals between the closing of the shear blades.

8. The method of operating shears having overlapping blades made of magnetic material, the cutting edge portion of one of said blades being capable of limited movement toward the plane of the cutting edge portion of the other blade, which comprises causing a magnetic attraction between the cutting edge portions of said blades at the time of closing thereof.

9. The method of operating shears having overlapping blades made of magnetic material, the cutting edge portion of one of said blades being capable of limited movement toward the plane of the cutting edge portion of the other blade, which comprises causing a magnetic attraction between the cutting edge portions of said blades at the time of closing thereof, and discontinuing such magnetic attraction when the blades are opened.

WILLIAM T. HONISS.